United States Patent [19]
Runciman

[11] 4,084,092
[45] Apr. 11, 1978

[54] RADIATION SCANNING SYSTEM

[75] Inventor: Herbert Morrison Runciman, Glasgow, Great Britain

[73] Assignee: Barr & Stroud Limited, Glasgow, Great Britain

[21] Appl. No.: 749,085

[22] Filed: Dec. 9, 1976

[30] Foreign Application Priority Data

Dec. 13, 1975 United Kingdom ............... 51155/75

[51] Int. Cl.² ............................................... G01J 1/00
[52] U.S. Cl. .................................... 250/347; 250/353; 350/6.8
[58] Field of Search ............... 250/347, 353, 334, 332, 250/236; 350/7

[56] References Cited
U.S. PATENT DOCUMENTS 3,845,298  10/1974  Runciman .......................... 350/7 X
4,019,804  4/1977  Collier ..................................... 350/7

*Primary Examiner*—Davis L. Willis
*Attorney, Agent, or Firm*—Mason, Fenwick & Lawrence

[57] ABSTRACT

An object-space scanning system for radiation wherein the scanning device comprises sets of planar reflecting surfaces arranged in pairs, one from each set, such that the two surfaces in a pair are disposed substantially at right angles to each other and the line of intersection of the surfaces is at right angles to the axis of rotation of the scanning device which is so arranged that incident radiation is sequentially reflected from the two surfaces of a pair before entering a focussing arrangement which focusses the radiation into a detector, the secondary scan direction being achieved by the fact that the angle included between the planar reflective surfaces of respective pairs differs by a very small angle successively around said axis.

4 Claims, 14 Drawing Figures

RADIATION SCANNING SYSTEM

This invention relates to radiation scanning systems, and in particular to such systems capable of scanning a parallel light portion of an optical system. Such scanning systems are usually referred to as "object-space" scanning systems.

A known form of object-space scanning system has a radiation-sensitive detector array located substantially at the focus of a converging lens which receives radiation from a field of view after reflection from a mirror drum. The drum has a plurality of planar mirrors arranged around its periphery, substantially parallel to the axis of rotation of the drum, adjacent mirrors being mutually inclined by a very small angle to the drum axis, successively around the periphery of the drum in order to achieve a multi-band scan of the detector array. In order to prevent obscuration the drum must be angled to introduce an angle between incident and reflected radiation and this results in disadvantages in the detected radiation image. Depending upon the orientation of drum angle serious errors can result in band contiguity or image distortion can result. Also, the drum size may require to be relatively large to permit radiation reflection at oblique incidence without loss of the radiation image.

It is an object of the present invention to provide an impoved form of object-space scanning system which obviates or mitigates one or more of the foregoing disadvantages.

According to the present invention there is provided a radiation scanning system comprising radiation-sensitive detection means, radiation-focussing means and radiation scanning means, arranged such that substantially parallel bundles of radiation from different parts of a scene are successively directed from a reflection station by said scanning means, and focussed by said focussing means onto said detection means, wherein said radiation scanning means comprises a plurality of optical members mounted for rotation about an axis, sequentially to pass through said reflection station, each said optical member comprising two planar radiation-reflecting surfaces disposed substantially at right angles to each other, the line of intersection of the planes containing said two radiation-reflecting surfaces being disposed at right angles to said axis of rotation the arrangement being such that radiation enters said detector after sequential reflection from the two reflective surfaces in said reflector station.

The optical members may be disposed around the outer periphery of a drum or around the inner periphery of an annular drum. Preferably the precise angle between the radiation-reflecting surfaces differs by a very small angle successively around the periphery of the drum or annular member, the arrangement being such that contiguous portions of the scanned scene are imaged onto the detection means to produce a two-dimensionally scanned image.

The radiation focussing means may be in the form of a lens or mirror system and the detection means may incorporate an array (i.e. linear) or matrix (i.e. two-dimensional) of detector elements.

The scanning system may incorporate a telescope (or an afocal optical assembly) between the scanning means and the scene being viewed.

Embodiments of the present invention will now be described by way of example with reference to the accompanying drawings, in which.

Figure 4A:
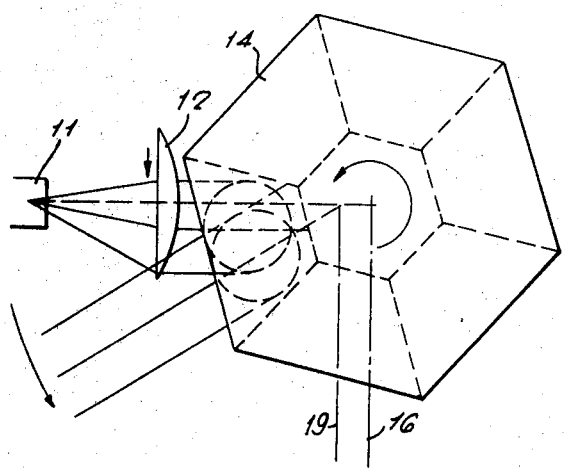
Figure 4B:
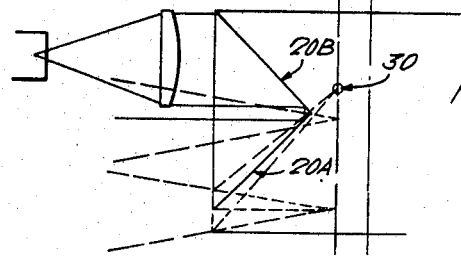
Figure 5A:
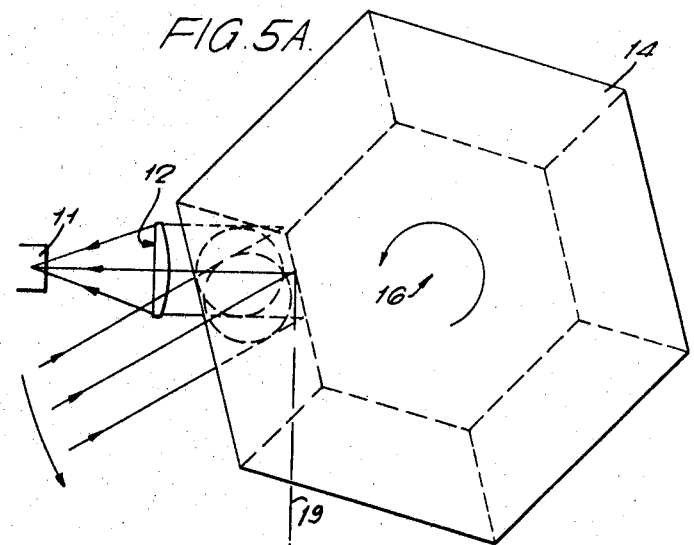
Figure 5B:
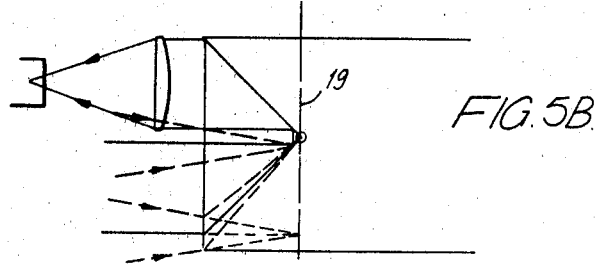
Figure 5C:
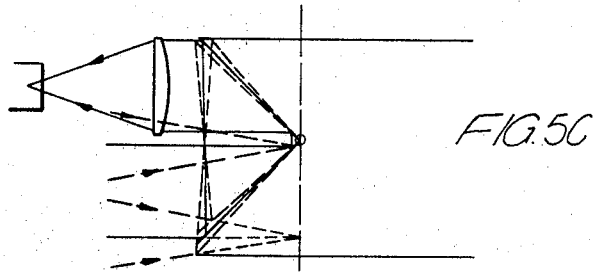
Figure 5D:
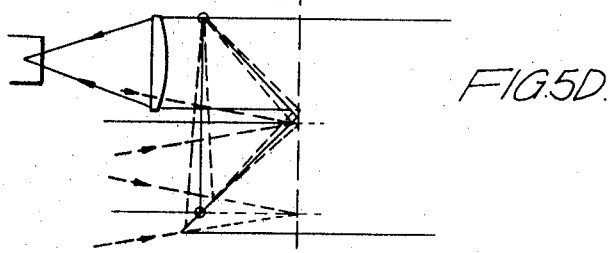
Figure 6:
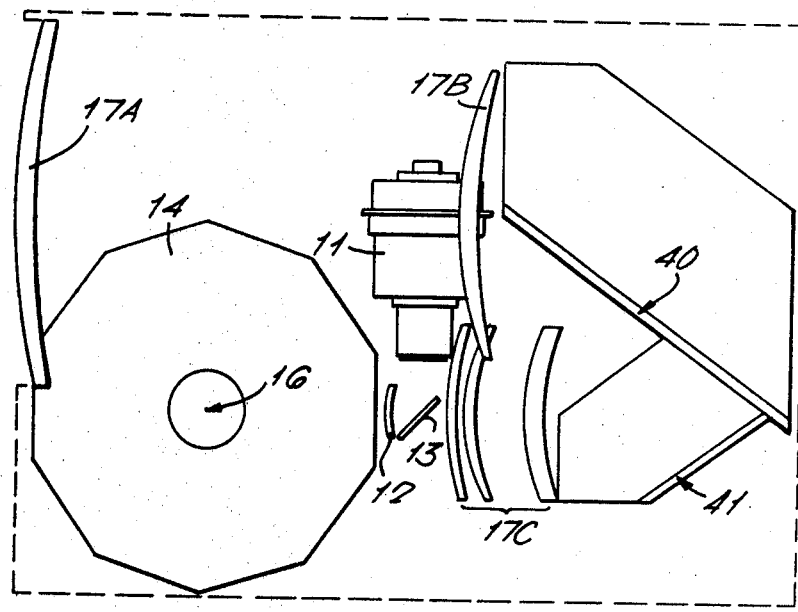
Figure 7:
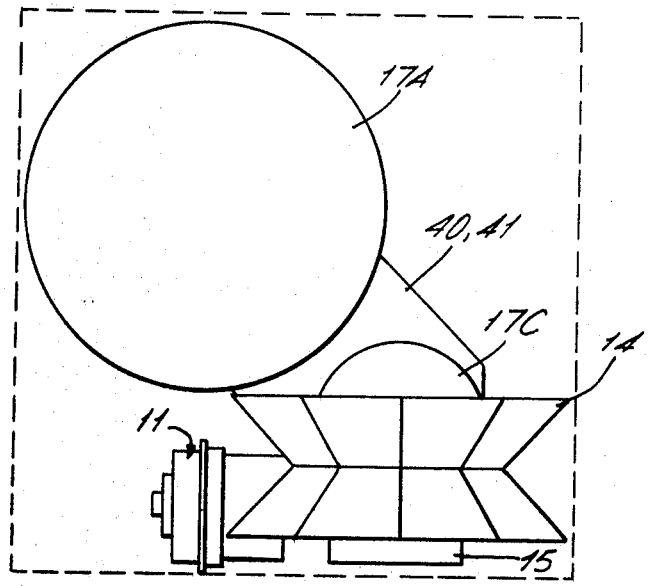

FIGS. 4A, B, C and D and FIGS. 5A, B, C and D diagrammatically illustrate modified systems according to the present invention;

FIGS. 6 and 7 are different elevational views of a preferred embodiment. and

Figure 8:
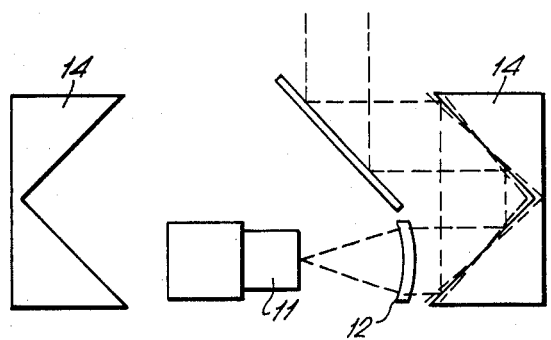

FIG. 8 diagrammatically illustrates a further embodiment.

Figure 1:
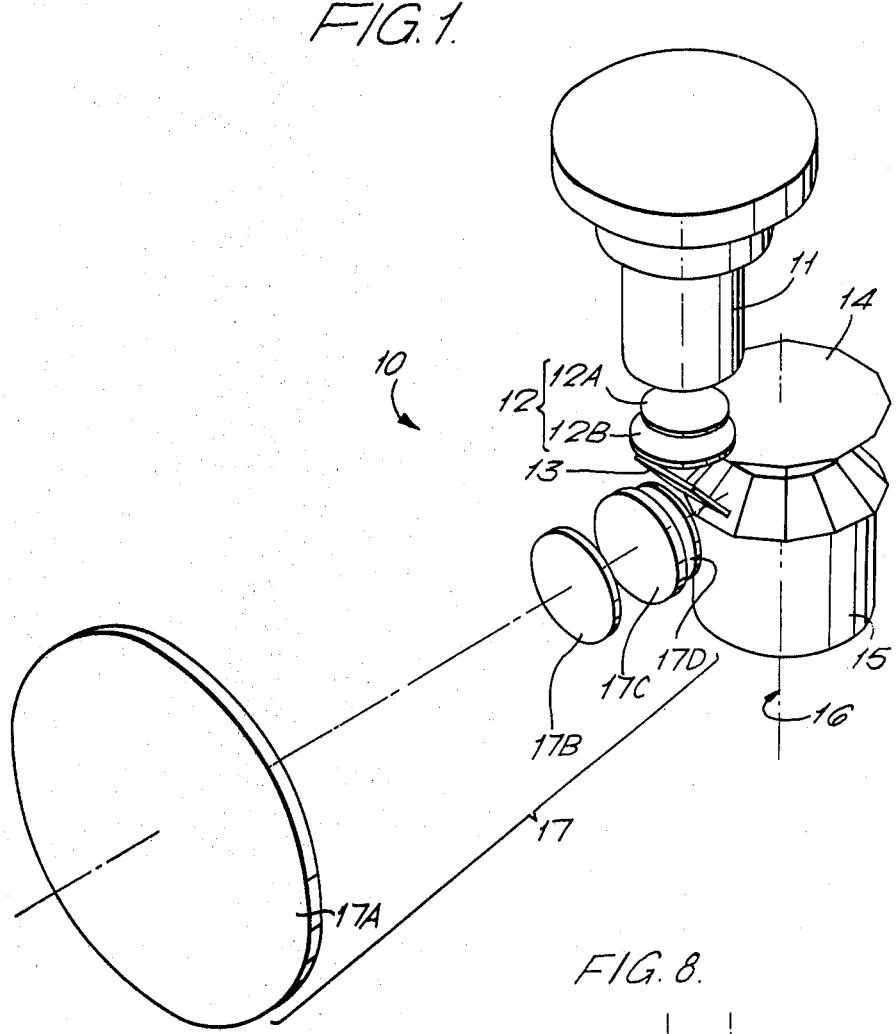
FIG. 1 illustrates in detail a first embodiment according to the present invention.

The radiation system 10 which is shown in FIG. 1 comprises an infra red radiation-sensitive detector 11, lenses 12A, 12B forming a radiation focussing means 12 for radiation incident thereon, a planar reflector 13, and a drum scanner 14 mounted for rotation by a motor 15 about an axis 16. Radiation from a field of view is received by an afocal optical assembly in the form of a telescope 17 having elements 17A, 17B, 17C and 17D and in consequence parallel light from the field of view is incident upon the scanner 14.

Figure 2:
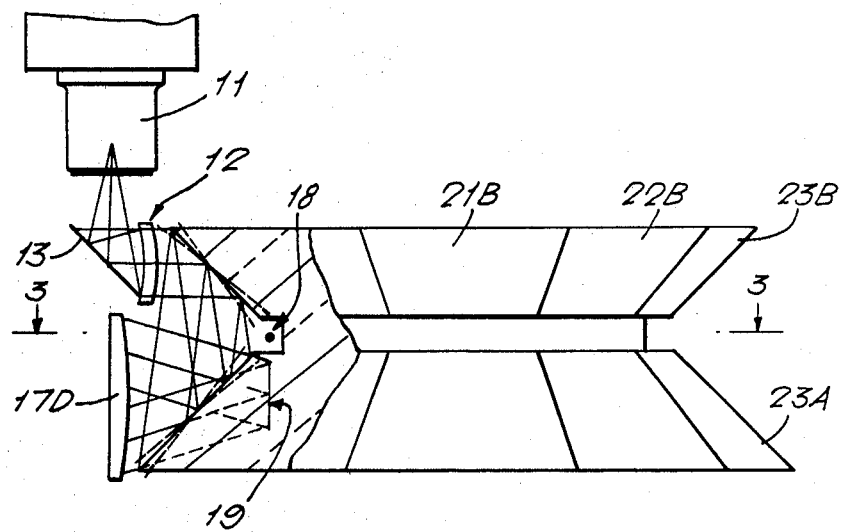
FIG. 2 shows a part of the FIG. 1 embodiment.
Figure 3:
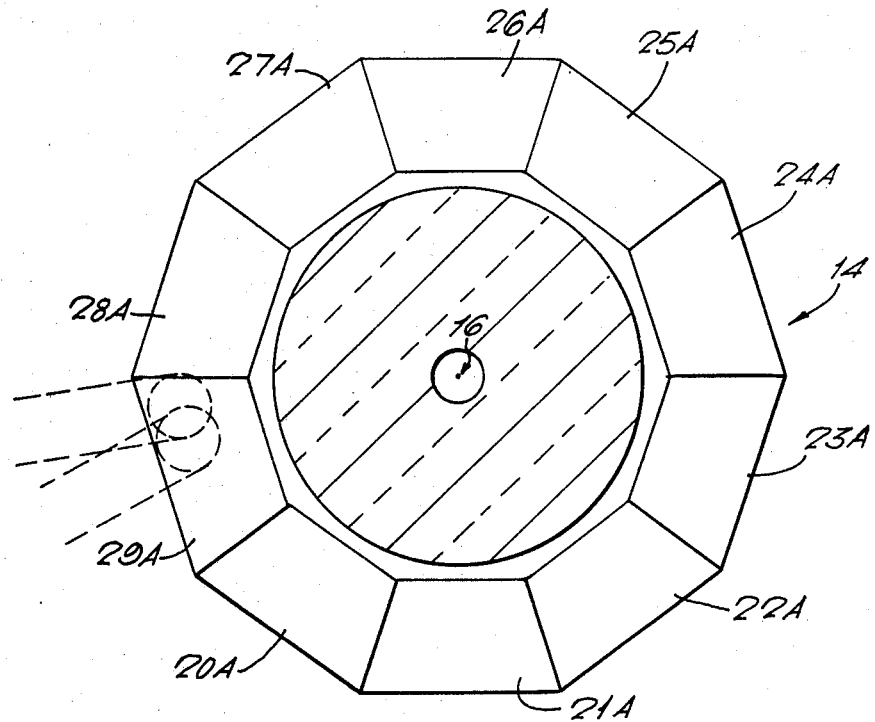
FIG. 3 is a sectional plan view of the drum scanner taken along line 3—3 of FIG. 2.

As is more clearly illustrated in FIGS. 2 and 3, the scanner 14 incorporates a rigid drum around the outer periphery of which are located pairs of planar reflecting surfaces 20A, 20B, 21A, 21B . . . 29A, 29B, each pair forming an optical member 20, 21 . . . 29. Radiation from element 17D of the telescope is incident upon one of the surfaces, say 29A, is reflected onto surface 29B and from there to the detector 11 via the focussing means 12 and the planar reflactor 13.

For the purpose of achieving a secondary scan the angle between the surfaces 20A, 20B, etc., differs slightly for each member 20 . . . 29. This causes the surfaces 20A, 21A . . . 29A shown in FIG. 3 to have slightly individual shapes when viewed in plan and the range of orientations of the individual surfaces is diagramatically shown in FIG. 2 in relation to the incident radiation. It will therefore be appreciated that the surfaces 20A, 20B, etc. which form each of the members 20 . . . 29 are substantially at right angles to each other and furthermore the surfaces 20A, . . . 29A and 20B . . . 29B are so disposed that in each case the planes containing pairs of surfaces 20A, 20B intersect in a respective line 18 which is at right angles to the axis 16.

By virtue of this arrangement distortion and contiguity errors are small and the radiation reflected from the scanner 14 into the detector 11 is parallel to and in the same plane as the incident radiation. That is, in the centre of the scanned field the parallel beam of incoming radiation is returned along its original direction after reflection, but is displaced by a distance sufficient to clear the incoming beam, due to the double reflection from the scanner 14.

In order to acheive the secondary scan as described above the surfaces forming each member 20 . . . 29 require to be tilted (and secured in the tilted position) away from the 90° position. If the telescope 17 is omitted the axes about which these surfaces are tilted may be located wherever is convenient, but if the telescope 17 is present in order to make most efficient use of the telescope these axes must be so located that the scanned beams of radiation in effect pass through the exit pupil 19 corresponding to the physical pupil defined by the telescope lens element 17A.

When the pupil 19 is located in a plane which is spaced from the axis 16 by substantially the same distance as each of the lines 18 the scanned beams of radiation enter the detector 11 at a constant angle. This can be achieved if the tilt axes of each pair of surfaces 20A, 20B. etc., are equidistant from the axis 16 each surface 20A, 20B being tilted to an equal extent but in opposite directions. Alternatively if the tilt axes coincide with the line 18 only one of the surfaces 20A, 20B requires to be tilted.

In the event that the beams of radiation need not enter the detector 11 at a constant angle the location of the tilt axes can be chosen to suit different criteria without affecting the low-distortion properties and contiguity properties of the present invention.

Figure 4C:
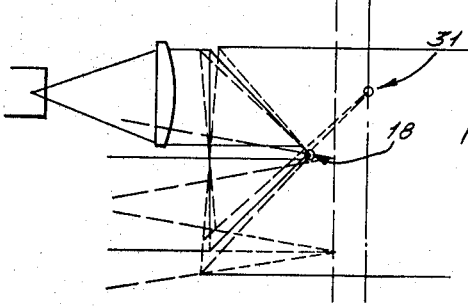
Figure 4D:
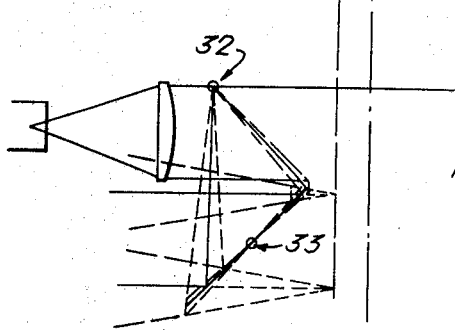

FIGS. 4A, 4B, 4C, 4D illustrate the effect of different positions of the secondary tilt axes upon size of the focussing lens 12 for a minimum size of scanner 14. It will be noted that the beams of radiation incident upon the detectors 11 track with rotation of the scanner 14. In FIG. 4A the scanner 14 is shown in plan view; in FIG. 4B the effect of tilting the reflecting surface 20A about an axis 30 lying in the plane containing the exit pupil 19 is shown; FIG. 4C shows the effects of tilting surface 20A about an axis 31 through which the axis of rotation 16 passes, the surface 20B being tilted about the line 18 (of FIG. 2); FIG. 4D shows surface 20B tilted about a point 32 at the outer periphery of the scanner 14 and surface 20A tilted about its mid point 33.

FIGS. 5A, 5B, 5C, 5D illustrate different positions of the secondary tilt axes and the size of scanner 14 required to permit the size of the lens 12 to be minimised. It will be noted that the scanner 14 of FIG. 5A is considerably larger than that of FIG. 4A.

FIGS. 6 and 7 illustrate a practical arrangement of components in a scanning system according to the present invention. The lens element 17A is mounted above the scanner 14 and between the lens elements 17B and 17C planar mirrors 40, 41 are located in order to permit incident radiation to be directed against the upper reflective surfaces of the scanner 14. After reflection from the lower reflective surface the emergent radiation passes through the focussing lens 12 and is reflected from planar reflector 13 into the detector 11. The motor 15 is mounted beneath the scanner 14. Fig. 8 shows another embodiment of the present invention in which the scanner 14 is an annular drum and the optical members are mounted around the inner periphery thereof.

Although the systems described herein make reference to radiation in the infra-red waveband it will be appreciated that by utilising suitable materials the arrangements may be used in the optical waveband, namely visible and ultra-violet wavebands.

What is claimed is:

1. A radiation scanning system operating in object space, comprising radiation-sensitive detection means, radiation-focussing means and radiation scanning means, arranged such that substantially parallel bundles of radiation from different parts of a scene are successively directed from a reflection station by said scanning means, and focussed by said focussing means onto said detection means, wherein said radiation scanning means comprises a plurality of optical members mounted for rotation about an axis so as sequentially to pass through said reflection station, each said optical member comprising two planar radiation-reflecting surfaces disposed substantially at right angles to each other, the line of intersection of the planes containing said two radiation-reflecting surfaces being disposed at right angles to said axis of rotation, the arrangement being such that radiation enters said detector after sequential reflection from the two reflective surfaces in said reflector station and wherein the precise angle between the radiation-reflecting surfaces of the optical members differs by a very small angle successively around said axis, whereby contiguous portions of the scanned scene are imaged onto the detection means to produce a two-dimensionally scanned image.

2. A radiation scanning system as claimed in claim 1, wherein said scanning means receives radiation from an afocal optical assembly the exit pupil of which is substantially coplanar with each of said lines of intersection.

3. A radiation scanning system as claimed in claim 1, wherein said optical members are mounted around the outer periphery of a drum.

4. A radiation scanning system as claimed in claim 1, wherein said optical members are mounted around the inner periphery of a drum which is annular.

* * * * *